United States Patent
Dimitrov et al.

(10) Patent No.: US 11,249,781 B2
(45) Date of Patent: Feb. 15, 2022

(54) CLOUD AGNOSTIC BLUEPRINT

(71) Applicant: VMware, Inc., Palo Alto, CA (US)

(72) Inventors: George P. Dimitrov, Sofia (BG);
Kristiyan Georgiev, Sofia (BG);
Alexander Dimitrov, Sofia (BG);
Alexandar Savov, Sofia (BG); Boris
Savov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 160 days.

(21) Appl. No.: 16/004,456

(22) Filed: Jun. 11, 2018

(65) Prior Publication Data
US 2019/0377591 A1 Dec. 12, 2019

(51) Int. Cl.
G06F 9/455 (2018.01)
G06F 8/60 (2018.01)
H04L 29/08 (2006.01)
H04L 29/06 (2006.01)

(52) U.S. Cl.
CPC .......... G06F 9/45558 (2013.01); G06F 8/60 (2013.01); H04L 63/20 (2013.01); H04L 67/30 (2013.01); G06F 2009/45562 (2013.01); G06F 2009/45587 (2013.01); G06F 2009/45595 (2013.01)

(58) Field of Classification Search
CPC ....... G06F 9/45558; G06F 8/60; H04L 63/20; H04L 67/30
See application file for complete search history.

(56) References Cited

U.S. PATENT DOCUMENTS

| | | | |
|---|---|---|---|
| 10,298,720 B1 * | 5/2019 | Miller | H04L 43/026 |
| 10,462,009 B1 * | 10/2019 | Shiramshetti | H04L 41/0886 |
| 2011/0270968 A1 * | 11/2011 | Salsburg | G06F 9/5072 709/224 |
| 2013/0232463 A1 * | 9/2013 | Nagaraja | G06F 8/61 717/101 |
| 2015/0378703 A1 * | 12/2015 | Govindaraju | G06F 8/60 717/174 |
| 2016/0337175 A1 * | 11/2016 | Rao | H04L 41/12 |
| 2017/0289060 A1 * | 10/2017 | Aftab | H04L 67/1097 |
| 2018/0287864 A1 * | 10/2018 | Hockett | G06N 20/00 |

* cited by examiner

Primary Examiner — Tammy E Lee
(74) Attorney, Agent, or Firm — Su IP Consulting

(57) ABSTRACT

A method to implement a cloud application includes receiving a blueprint of the cloud application, wherein the blueprint specifies virtual machines and a network connecting the virtual machines and being isolated from traffic external to the virtual machines. The method further includes automatically selecting a cloud profile specifying a cloud provider and a network isolation strategy and deploying the blueprint with the cloud provider by causing the cloud provider to create the virtual machines, create the network with the network isolation strategy, and attach the virtual machines to the network.

19 Claims, 5 Drawing Sheets

CLOUD AGNOSTIC BLUEPRINT

BACKGROUND

A cloud automation tool, such as VMware vRealize Automation, is used to design, deploy, and manage applications on the cloud. The cloud automation tool allows a developer to design a blueprint for an application using a visual canvas with a drag and drop interface, publish the blueprint, and deploy the blueprint with a cloud provider.

DETAILED DESCRIPTION

Figure 1:
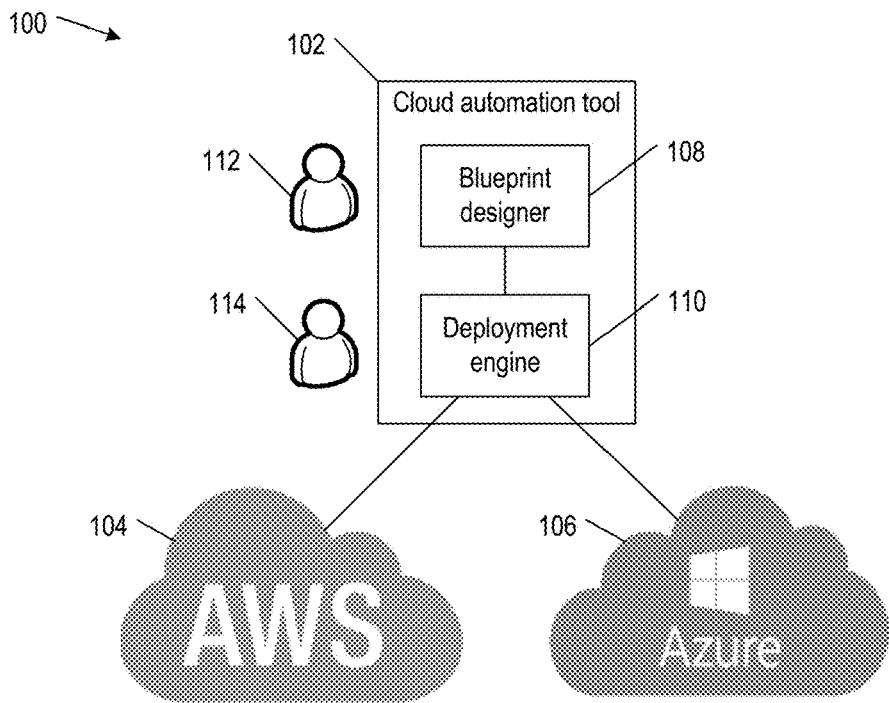
FIG. 1 is a block diagram illustrating a computing system according to examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

A developer designs an application by defining a blueprint that describes virtual machines (VMs) and a network that connects the VMs. The developer specifies a network isolation strategy for the network when the VMs are to be isolated from traffic external to the virtual machines (e.g., traffic outside of a subnetwork or members of a security group). This makes the blueprint specific to certain cloud providers offering the specified network isolation strategy. This further reduces the control of a cloud administrator tasked with deciding where to deploy the application based on other factors, such as cost and performance.

Method and system are provided to relieve a developer from implementation details specific to the cloud and give a cloud administrator the freedom to decide the best network isolation strategy for a given application (workload). The developer describes a blueprint specifying VMs and a network connecting the VMs. The network model used in the blueprint only represents the intent that the VMs are connected and isolated on a virtual network but not the actual network infrastructure. In other words, the developer only defines the VMs are connected to an isolated network so the blueprint is agnostic to the possible cloud providers. The cloud administrator sets the networking constructs used during deployment by specifying a network isolation strategy and any related properties.

The cloud administrator may apply different network isolation strategies depending on the cloud/workload/environment. The network isolation strategies include isolation by subnetwork or security group, or no network isolation at all. Isolation by subnetwork involves creating a new subnetwork during deployment and attaching VMs that must be isolated to the new subnetwork. Isolation by security group involves creating a new security group with rules or policies to allow communication only between VMs that must be isolated and attaching the VMs to an existing network. In certain cases (e.g., during development, proof-of-concept, or testing), the cloud administrator can disable isolation to help preserve resources for other needs.

The cloud administrator may apply different network isolation strategies to different cloud provider because they offer different limits of maximum subnetworks and security groups per subscription. For example, Amazon Web Services (AWS) allows 200 subnetworks and 500 security groups while Microsoft Azure allows 1000 subnetworks and 400 security groups. The cloud administrator may decide to use security groups over subnetworks or vice versa depending on the workload. The cloud administrator may decide that isolation by subnetworks is best for production environments and isolation by security groups is best for staging environments to leverage both limitation of a single subscription.

The cloud administrator may have two subscriptions (accounts) with the same cloud provider with one using isolation by subnetworks and the other using isolation by security groups. One subscription may be first selected based on constraints for the application. If the blueprint for the application is provisioned several times, the second subscription may be selected when the quota for the first subscription is used up.

FIG. 1 is a block diagram illustrating a computing system 100 according to examples of the present disclosure. Computing system 100 includes a cloud automation tool 102 for designing, deploying, and managing applications on the cloud. The cloud may include any combination of private and public cloud providers. For example, the public cloud providers include cloud providers (AWS) 104 and (Azure) 106.

Cloud automation tool 102 includes a blueprint designer 108 and a deployment engine 110. Alternatively, blueprint designer 108 and deployment engine 110 may be independent software. A developer 112 uses blueprint designer 108 to create blueprints for applications on the cloud and request deployment of the applications. A blueprint may specify VMs and an isolated network connecting the VMs but without defining a network isolation strategy for the isolated network. A cloud administrator 114 uses deployment engine 110 to create cloud profiles each specifying a cloud provider and a network isolation strategy. Deployment engine 110 processes a deployment request by selecting a cloud profile that is appropriate for the application and deploying the blueprint with the cloud provider and the network isolation strategy specified in the selected cloud profile.

Figure 2:
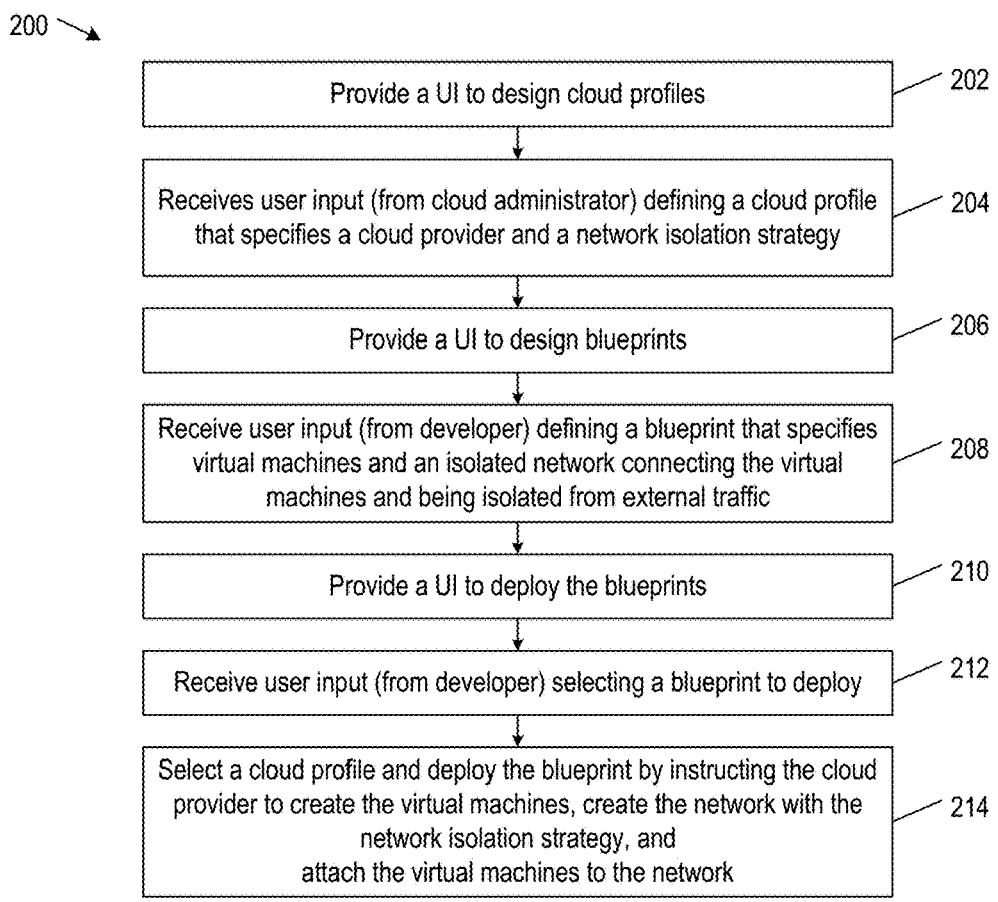
FIG. 2 is a block diagram illustrating a flowchart of a method to implement a cloud automation tool in the system of FIG. 1 in some examples of the present disclosure.

FIG. 2 is a block diagram illustrating a flowchart of a method 200 to implement cloud automation tool 102 (FIG. 1) in some examples of the present disclosure. Method 200 may be implemented as instructions encoded on a computer-readable medium that is to be executed by a processor in a computer system. Method 200 may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 200 may begin in block 202.

In block 202, cloud automation tool 102 provides a user interface for cloud administrator 114 (FIG. 1) to define cloud profiles. For example, deployment engine 110 (FIG. 1) generates a graphical user interface (GUI) having elements to create cloud profiles.

Figure 3:
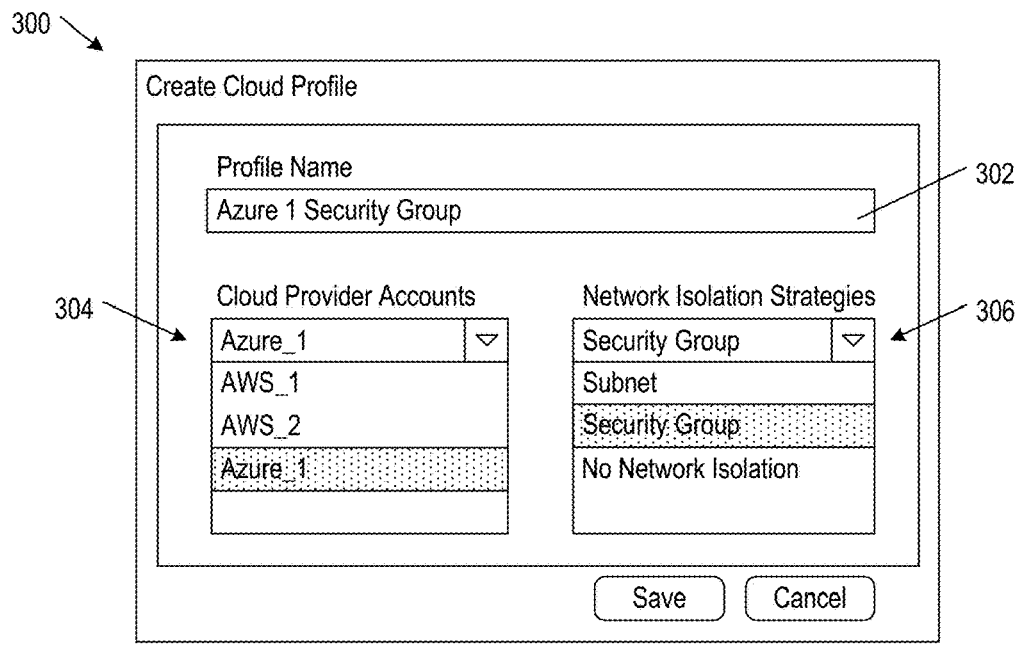
FIG. 3 illustrates a graphical user interface provided by a deployment engine in the system of FIG. 1 in some examples of the present disclosure.

FIG. 3 illustrates a "Create Cloud Profile" window 300 provided by deployment engine 110 (FIG. 1) in some examples of the present disclosure. Window 300 includes a text box 302 for user input of a profile name, a dropdown list 304 for user selection of a cloud provider account, and a dropdown list 306 for user selection of a network isolation strategy. The available cloud provider accounts are those created by cloud administrator 114 (FIG. 1) with cloud providers 104, 106 and added by cloud administrator 114 to deployment engine 110. The available network isolation strategies include isolation by subnetwork, security group, or no network isolation. After selecting a network isolation strategy, cloud administrator 114 (FIG. 1) may set additional properties. For example, after selecting isolation by subnetwork, cloud administrator 114 may select an existing network in which to create a new subnetwork and set the size of the new subnetwork. Cloud administrator 114 may create and save any number of cloud profiles, including multiple profiles from one cloud provider account.

Referring to FIG. 2, block 204 may be followed by block 204.

Figure 5:
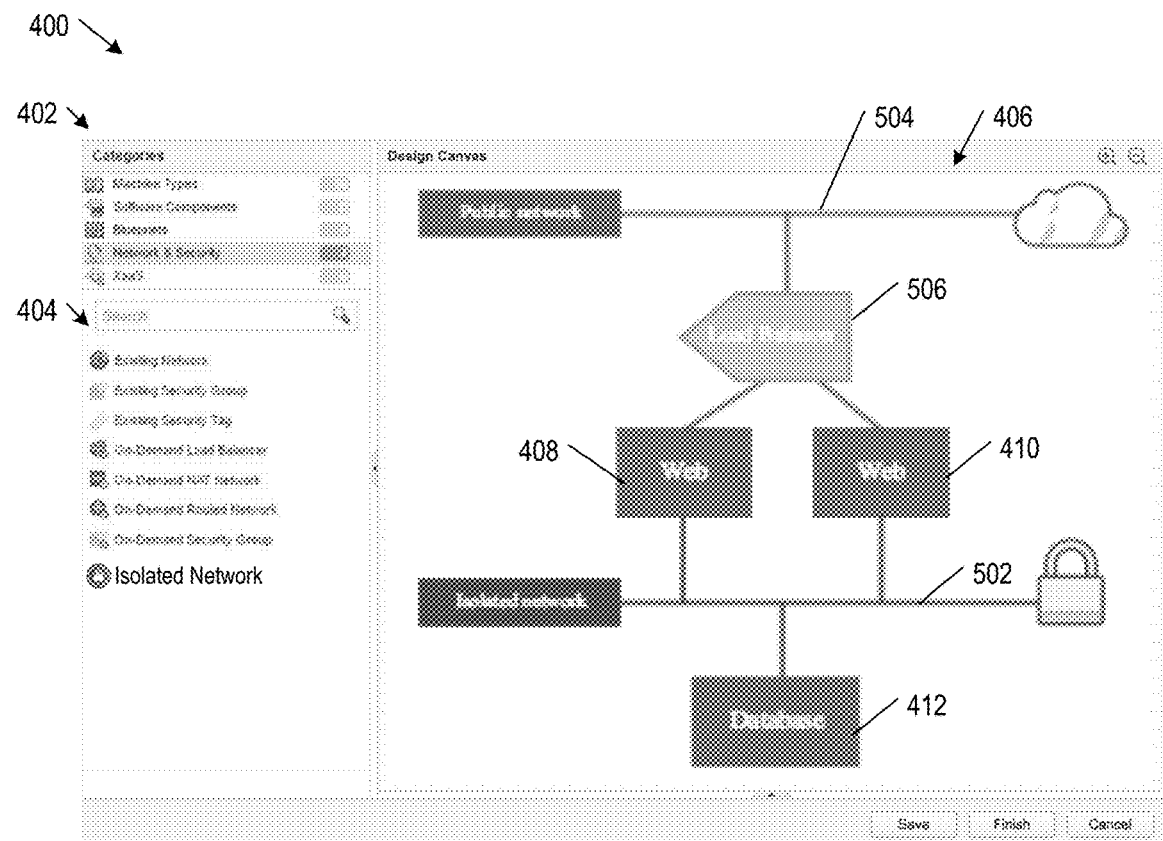

In block 204, cloud automation tool 102 (FIG. 1) receives user input from cloud administrator 114 (FIG. 1) defining a cloud profile. For example, deployment engine 110 (FIG. 1) receives such user input from cloud administrator 114 via GUI 500 (FIG. 5). Block 204 may be followed by block 206.

In block 206, cloud automation tool 102 provides a user interface for developer 112 (FIG. 1) to design blueprints of applications implemented on the cloud. For example, blueprint designer 108 (FIG. 1) generates a GUI having a visual canvas with a drag and drop interface to design the blueprints.

Figure 4:
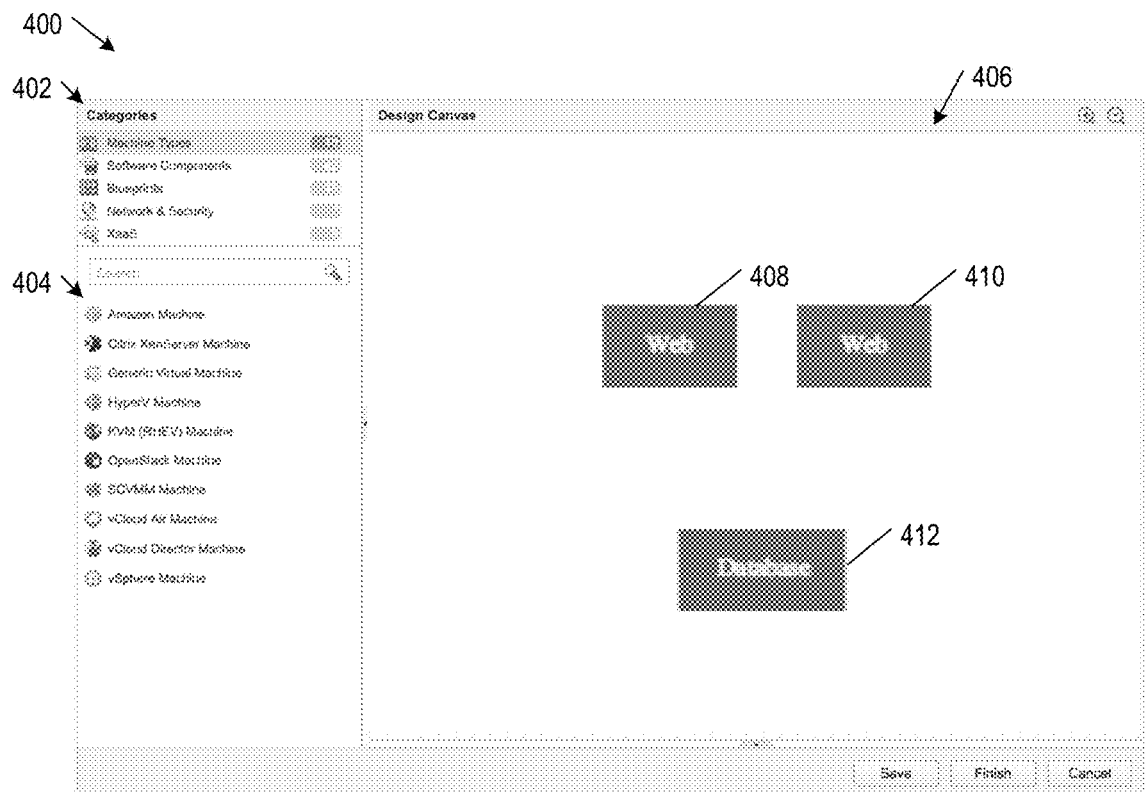
FIGS. 4 and 5 illustrate a graphical user interface provided by a blueprint designer in the system of FIG. 1 in some examples of the present disclosure.

FIG. 4 illustrates a GUI 400 provided by blueprint designer 108 (FIG. 1) to construct an application in some examples of the present disclosure. GUI 400 includes a "Categories" pane 402 for selecting a category of components, a components pane 404 for selecting a component from a selected category, and a "Design Canvas" pane 406 for dragging and dropping a selected component.

Referring to FIG. 2, block 206 may be followed by block 208.

In block 208, cloud automation tool 102 receives user input from developer 112 (FIG. 1) defining a blueprint that specifies VMs and an isolated network connecting the VMs and being isolated from external traffic.

Referring to FIG. 4, a developer 112 (FIG. 1) may specify the VMs by selecting the "Machine Types" category in the Categories pane 402 and then dragging and dropping the desired VMs from a corresponding components pane 404 onto the Design Canvas pane 406. For example, developer 112 drags and drops base VMs 408, 410, and 412 onto design canvas 406. Developer 112 then specifies the software for VMs 408, 410, and 412 by selecting the "Software Components" category in the Categories pane 402 and then dragging and dropping the appropriate software from components pane 404 onto the corresponding VMs in the Design Canvas pane 406. For example, developer 112 drags and drops web servers on VMs 408, 410 and database server on VM 412. Alternatively, developer 112 may select the "Blueprints" category in the Categories pane 402 and then drag and drop VMs 408, 410 and 412 preconfigured with the appropriate software onto the Design Canvas pane 406.

Referring to FIG. 5, developer 112 (FIG. 1) may specify the isolated network by selecting the "Network & Security" category in categories pane 402 and then dragging and dropping an (isolated) network 502 from a corresponding components pane 404 onto design canvas 406. Network 502 does not specify a network isolation strategy, such as isolation by subnetwork, security group, or no isolation at all. Developer 112 attaches web server VMs 408, 410 and database server VM 412 to network 502. For example, developer 112 selects each VM and set its network to network 502 through a dialog box.

Developer 112 may add other components to the application. For example, developer 112 may add a public network 504 and a load balancer 506 connecting public network 504 and web server VMs 408, 410. Public network 504 may be an existing network, an on-demand network address translation (NAT) network, or an on-demand routed network that is dragged and dropped from the components pane 404. Load balancer 506 may be an on-demand load balancer dragged and dropped from the components pane 404. Once the blueprint is defined, developer 112 may request deployment of the application in the blueprint.

Referring to FIG. 2, block 208 may be followed by block 210.

In block 210, cloud automation tool 102 provides a user interface for developer 112 (FIG. 1) to deploy the blueprints. For example, deployment engine 110 (FIG. 1) generates a GUI having elements to the blueprints.

Figure 6:
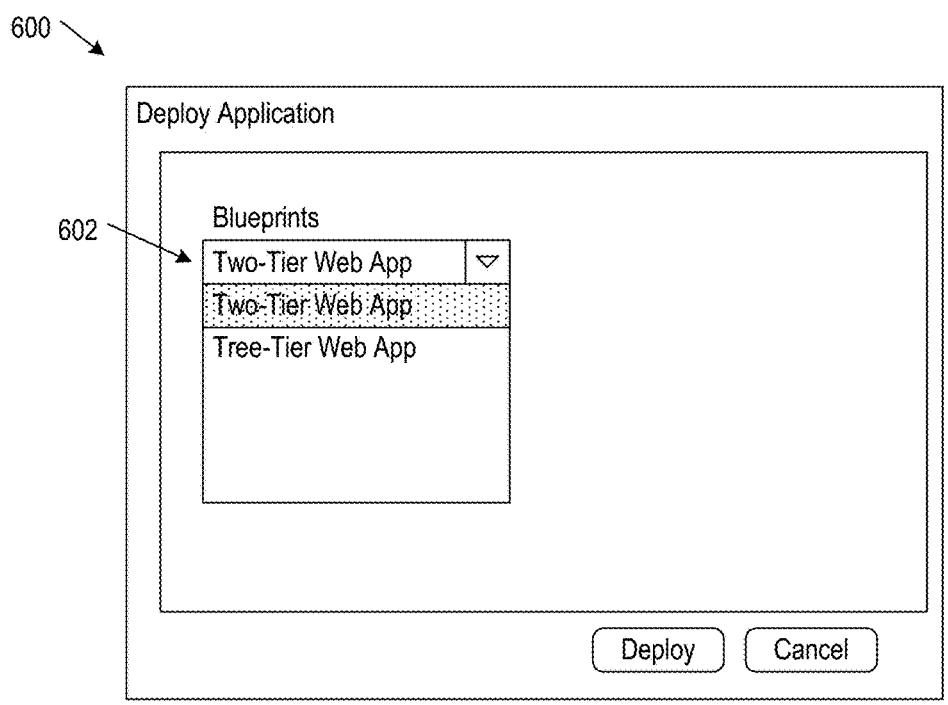
FIG. 6 illustrates a graphic user interface provided by the deployment engine in the system of FIG. 1 in some examples of the present disclosure.

FIG. 6 illustrates a "Deploy Application" window 600 provided by deployment engine 110 (FIG. 1) in some examples of the present disclosure. Window 600 includes a dropdown list 602 for user selection of a blueprint to deploy.

Referring to FIG. 2, block 210 may be followed by optional block 212.

In optional block 212, cloud automation tool 102 receives user selection of a blueprint. For example, deployment engine 110 (FIG. 1) receives such user selection via GUI 600 (FIG. 6). Block 212 may be followed by block 214.

In block 214, cloud automation tool 102 deploys the application in the selected blueprint by (1) automatically selecting a cloud profile and (2) instructing the cloud provider specified in the selected cloud profile to (a) create VMs and a network with the network isolation strategy specified in the selected cloud profile and (b) attach the VMs to the network. For example, deployment engine 110 (FIG. 1) may automatically select a cloud profile from the available cloud profiles created based on default rules or customized rules specified by cloud administrator 114 (FIG. 1). The default rules may switch from one cloud profile to another once the allotted subnetworks or security groups for a cloud provider account are depleted. Cloud administrator 114 may customize the rules based on an application's environment. For example, the rules may specify an application in a production environment is to be deployed to a cloud profile that uses subnetworks, an application in a staging environment is to be deployed with a cloud profile that uses security groups, and an application in a testing environment is to be deployed with a cloud profile that uses no network isolation.

Figure 7:
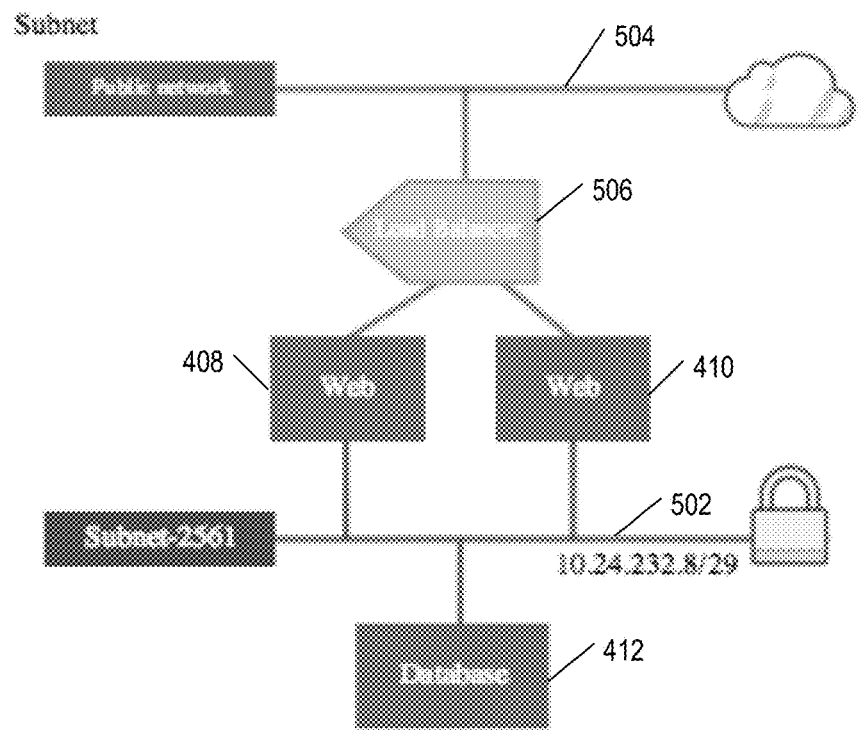
FIG. 7 illustrates a deployment where an isolated network is implemented with a new subnetwork in some examples of the present disclosure.
Figure 8:
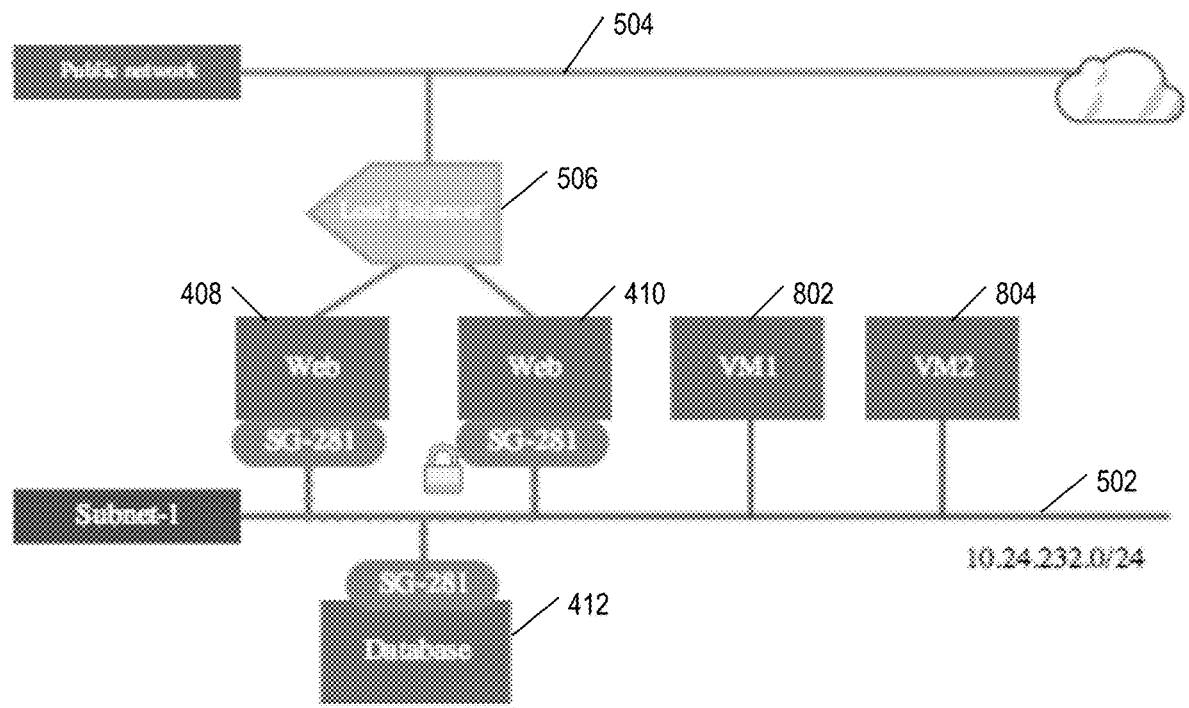
FIG. 8 illustrates a deployment where an isolated network is implemented with a new security group on an existing subnetwork in some examples of the present disclosure.
Figure 9:
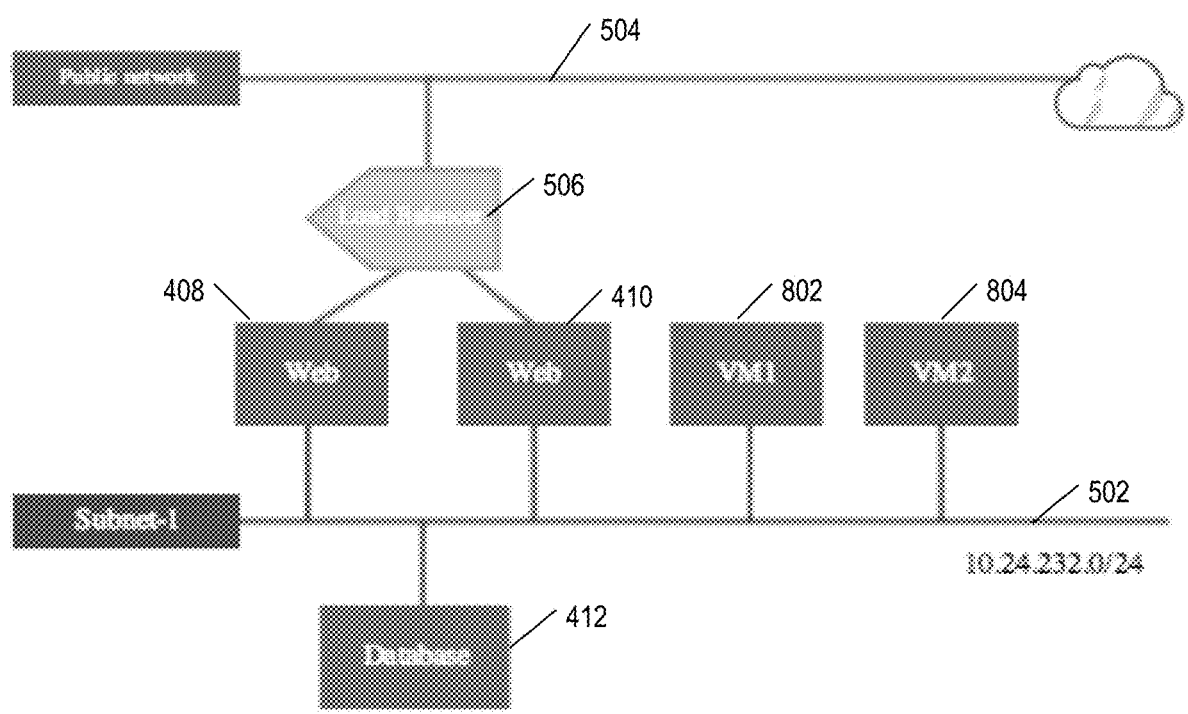
FIG. 9 illustrates a deployment where a network is implemented with an existing subnetwork without any security group in some examples of the present disclosure.

Once a cloud profile is selected, deployment engine 110 may use the application programming interface (API) of the selected cloud provider to issue calls to create the VMs and the network. FIGS. 7 to 9 illustrates one such deployment with different network isolation strategies.

FIG. 7 illustrates a deployment where an isolated network 502 is implemented with a new subnetwork 2561 in some examples of the present disclosure. Subnetwork 2561 is created during deployment. Subnetwork 2561 is only connected to VMs 408, 410, and 412 so traffic external to subnetwork 2561 is prevented from directly reaching VMs 408, 410, and 412.

FIG. 8 illustrates a deployment where an isolated network 502 is implemented with a new security group 281 on an existing subnetwork 1 in some examples of the present disclosure. Security group 281 is created during deployment. Other VMs 802 and 804 may also be connected to subnetwork 1 but security group 281's rules prevent traffic external to members of security group 281 from directly reaching VMs 408, 410, 412.

FIG. 9 illustrates a deployment where a network 502 is implemented with an existing subnetwork 1 without any security group in some examples of the present disclosure. Thus, VMs 408, 410, 412, 802, and 804 may freely communicate over exiting subnetwork 1 as well as other machines on public network 504.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to implement a cloud application, comprising:
    receiving a blueprint of the cloud application, the blueprint specifying virtual machines and a network connecting the virtual machines and being isolated from traffic external to the virtual machines;
    receiving user input defining cloud profiles;
    automatically selecting a cloud profile specifying a cloud provider and a network isolation strategy from the cloud profiles based on a rule associated with allotted network isolation resources being depleted or a rule associated with an environment of the cloud application;
    based on the cloud profile, deploying the blueprint with the cloud provider by instructing the cloud provider to:
        create the virtual machines;
        create the network with the network isolation strategy; and
        attach the virtual machines to the network.

2. The method of claim 1, wherein each cloud profile of the cloud profiles specifies a corresponding cloud provider and a corresponding network isolation strategy.

3. The method of claim 2, further comprising receiving the user input defining each cloud profile of the cloud profiles by selecting the corresponding cloud provider and the corresponding network isolation strategy.

4. The method of claim 3, wherein selecting the corresponding network isolation strategy comprises selecting the use of a subnetwork or a security group to isolate the virtual machines from other virtual machines.

5. The method of claim 1, further comprising receiving the user input defining the cloud profile by selecting the cloud provider and the network isolation strategy.

6. The method of claim 5, wherein selecting the network isolation strategy comprises selecting the use of a subnetwork or a security group to isolate the virtual machines from other virtual machines.

7. A non-transitory, computer-readable storage medium encoded with instructions executable by a processor to implement a cloud application, the instructions comprising:
    receiving a blueprint of the cloud application, the blueprint specifying virtual machines and a network connecting the virtual machines and being isolated from traffic external to the virtual machines;
    receiving user input defining cloud profiles;
    automatically selecting a cloud profile specifying a cloud provider and a network isolation strategy from the cloud profiles based on a rule associated with allotted network isolation resources being depleted or a rule associated with an environment of the cloud application;
    based on the cloud profile, deploying the blueprint with the cloud provider by instructing the cloud provider to:
        create the virtual machines;
        create the network with the network isolation strategy; and
        attaching the virtual machines to the network.

8. The non-transitory, computer-readable storage medium of claim 7, wherein each cloud profile of the cloud profiles specifies a corresponding cloud provider and a corresponding network isolation strategy.

9. The non-transitory, computer-readable storage medium of claim 8, wherein the instructions further comprise receiving the user input defining each cloud profile of the cloud profiles by selecting the corresponding cloud provider and the corresponding network isolation strategy.

10. The non-transitory, computer-readable storage medium of claim 9, wherein selecting the corresponding network isolation strategy comprises selecting the use of a subnetwork or a security group to isolate the virtual machines from other virtual machines.

11. The non-transitory, computer-readable storage medium of claim 7, wherein the instructions further comprise receiving the user input defining the cloud profile by selecting the cloud provider and the network isolation strategy.

12. The non-transitory, computer-readable storage medium of claim 11, wherein selecting the network isolation strategy comprises selecting the use of a subnetwork or a security group to isolate the virtual machines from other virtual machines.

13. A computer system, comprising:
    a processor; and
    a non-transitory computer-readable medium encoded with instructions for implementing a cloud automation tool, which in response to execution by the processor, cause the processor to:
        receive a blueprint of the cloud application, the blueprint specifying virtual machines and a network connecting the virtual machines and being isolated from traffic external to the virtual machines;

receive user input defining cloud profiles;

automatically select a cloud profile specifying a cloud provider and a network isolation strategy from the cloud profiles based on a rule associated with allotted network isolation resources being depleted or a rule associated an environment of the cloud application;

based on the cloud profile, deploy the blueprint with the cloud provider by instructing the cloud provider to:

create the virtual machines;

create the network with the network isolation strategy; and attach the virtual machines to the network.

14. The computer system of claim 13, wherein each cloud profile of the cloud profiles specifies a corresponding cloud provider and a corresponding network isolation strategy.

15. The computer system of claim 14, wherein the deployment engine is further configured to receive the user input defining each cloud profile of the cloud profiles by selecting the corresponding cloud provider and the corresponding network isolation strategy.

16. The computer system of claim 15, wherein selecting the corresponding network isolation strategy comprises selecting the use of a subnetwork or a security group to isolate the virtual machines from other virtual machines.

17. The computer system of claim 13, wherein the cloud automation tool comprises a deployment engine configured to receive the user input defining the cloud profile by selecting the cloud provider and the network isolation strategy.

18. The computer system of claim 17, wherein selecting the network isolation strategy comprises selecting the use of a subnetwork or a security group.

19. The computer system of claim 13, wherein the cloud automation tool comprises a blueprint designer configured to receive user input designing the blueprint.

* * * * *